United States Patent [19]
Wyner

[15] 3,653,577
[45] Apr. 4, 1972

[54] CAKE COVER
[72] Inventor: Bernice Irene Wyner, 1624 44th Street, Des Moines, Iowa 50310
[22] Filed: June 15, 1970
[21] Appl. No.: 46,175

[52] U.S. Cl. ................................229/23 R, 229/43, 229/45
[51] Int. Cl. .........................................................B65d 13/00
[58] Field of Search ..............229/23 A, 23 AB, 23 AX, 23 B, 229/23 R, 23 BT, 23 C, 43, 45, 30

[56]  References Cited
UNITED STATES PATENTS

| 2,370,927 | 3/1945 | Anderson | 229/45 |
| 2,193,925 | 3/1940 | Huye | 229/23 A |
| 2,193,924 | 3/1940 | Huye | 229/23 A |
| 2,667,297 | 1/1954 | McReary | 229/45 UX |
| 2,683,561 | 7/1954 | Rice | 229/23 B |
| 2,827,222 | 3/1958 | Buttery | 229/23 B X |
| 3,438,562 | 4/1969 | Connor et al. | 229/45 X |

FOREIGN PATENTS OR APPLICATIONS
835,202    2/1970    Canada....................................229/30

Primary Examiner—M. Henson Wood, Jr.
Assistant Examiner—Thomas C. Culp, Jr.
Attorney—Zarley, McKee & Thomte

[57] ABSTRACT

A cake cover comprising a bottom portion and a foldable top portion. The top portion comprises a central quadrilateral portion having first, second, third and fourth flaps extending from the periphery thereof. The flaps are foldable to a flat condition adjacent the underside of the central portion. The top portion may be unfolded from its flat condition to an assembled condition and is maintained in its assembled condition by a plurality of snap-tab fastener elements. The bottom portion comprises a quadrilateral base portion having upstanding wall members at the periphery thereof. The top portion, when in its folded condition, may be received between the wall members adjacent the base portion for storage purposes. The top portion, when in its assembled condition, may be detachable secured to the wall members to provide a cover means for a cake. The assembled cover is provided with a handle to permit carrying of a cake housed therein.

3 Claims, 7 Drawing Figures

Patented April 4, 1972  3,653,577
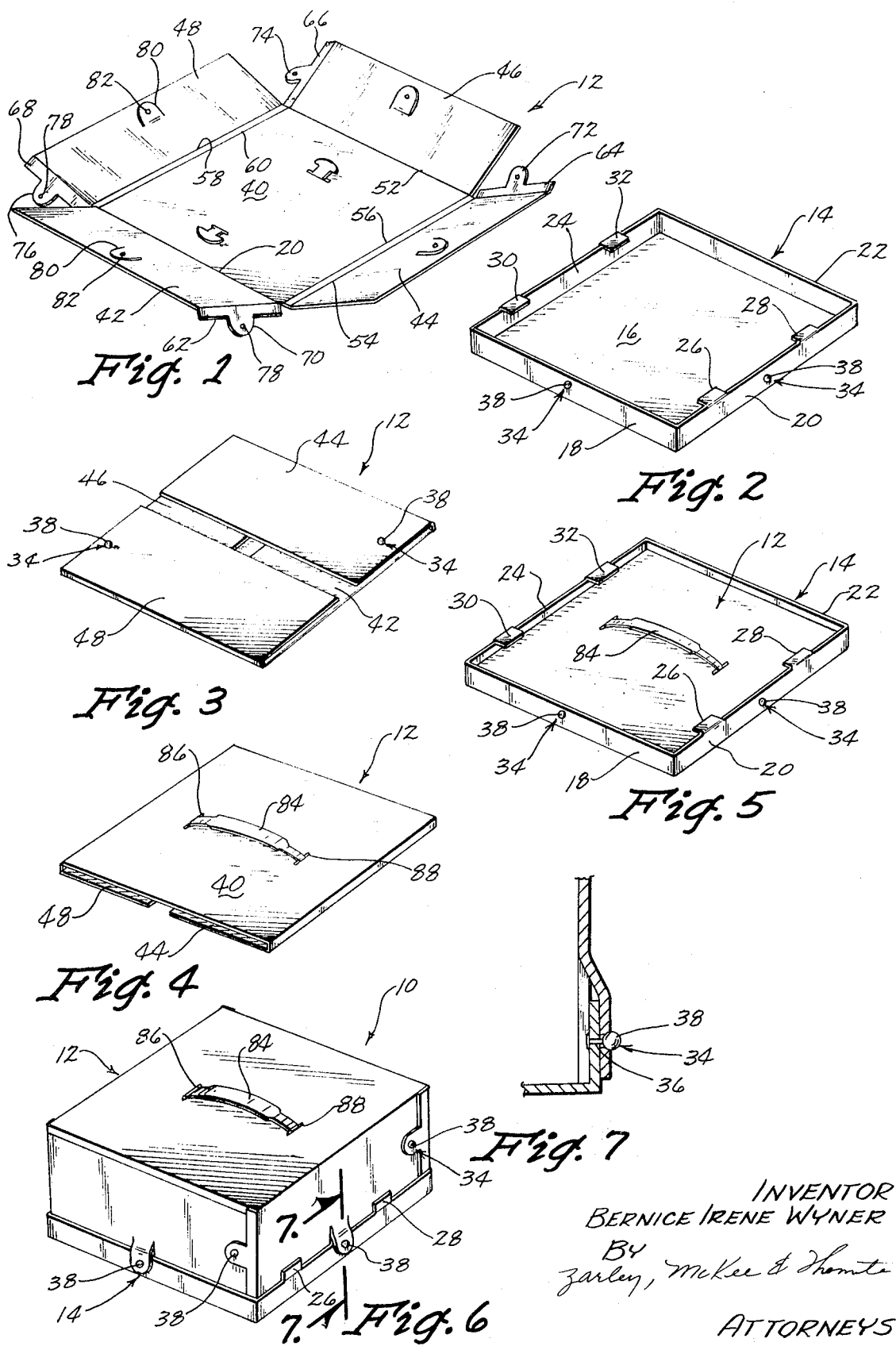
INVENTOR
BERNICE IRENE WYNER
BY
Zarley, McKee & Thomte
ATTORNEYS

CAKE COVER

Conventional cake covers are inconvenient to store, difficult to use and frequently come apart during use. Further, the conventional collapsible cake covers permit the cake to dry out.

Additionally, the conventional collapsible cake covers are difficult to handle in their collapsed state.

Therefore, it is a principal object of this invention to provide an improved cake cover.

A further object of this invention is to provide a foldable cake cover.

A further object of this invention is to provide a foldable cake cover which is convenient to use.

A further object of this invention is to provide a cake cover which prevents the cake from drying out.

A further object of this invention is to provide a foldable cake cover which will not come apart during use.

A further object of this invention is to provide a cake cover which may be re-used.

A further object of this invention is to provide a foldable cake cover which is easily handled when in its collapsed state.

A further object of this invention is to provide a foldable cake cover which is economical of manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a bottom perspective view of the top portion of the cover in a semi-folded state.

FIG. 2 is a perspective view of the bottom portion of the cover.

FIG. 3 is a bottom perspective view of the folded top portion of the cover.

FIG. 4 is a top perspective view of the folded top portion of the cover.

FIG. 5 is a perspective view similar to FIG. 2 except that the folded top portion has been placed within the bottom portion.

FIG. 6 is a perspective view of the assembled cover.

FIG. 7 is an enlarged sectional view taken along lines 7—7 of FIG. 6.

The cover of this invention is generally designated by the reference numeral 10 comprising a top portion 12 and a bottom portion 14. Bottom portion 14 includes a flat quadrilateral base portion 16 having wall members 18, 20, 22 and 24 extending upwardly from the periphery thereof. Flexible tabs 26 and 28 extend inwardly from wall member 20 in a spaced apart relationship as seen in FIG. 2. Flexible tabs 30 and 32 extend inwardly from wall member 24 in a spaced apart relationship as also shown in FIG. 2. Each of the wall members have a "snap" fastener element 34 extending outwardly from the exterior surface thereof. Each of the elements 34 include a stem 36 having a ball 38 on the outer end thereof.

Top portion 12 comprises a quadrilateral central portion 40 and flaps 42, 44, 46 and 48 extending therefrom. For purposes of description, each of the flaps 42, 44, 46 and 48 as well as the central portion 40 will be described as having inner and outer surfaces, the inner surfaces being illustrated in FIG. 1. Fold line 50 is provided between flap 42 and central portion 40 with fold line 52 being provided between flap 46 and central portion 40. Spaced apart fold lines 54 and 56 are provided between flap 44 and central portion 40 with spaced apart fold lines 58 and 60 being provided between flap 48 and central portion 40.

Flaps 42, 44, 46 and 48 have foldable flap portions 62, 64, 66 and 68 extending from one end thereof as shown in FIG. 1. Flap portions 62, 64, 66 and 68 have tab fasteners 70, 72, 74 and 76 thereon respectively which are each provided with an opening 78 therein. As best seen in FIG. 1, the flaps 42, 44, 46 and 48 each have a tab fastener 80 provided therein with an opening 82 formed therein. A flexible handle 84 is secured to top portion 12 by means of its opposite ends being extended through slits 86 and 88 formed in central portion 40.

The top portion 12 may be folded to the position illustrated in FIG. 3 and FIG. 4 so that the flaps 42, 44, 46 and 48 are positioned at the underside of central portion 40. For storage purposes, the folded top portion 12 of FIG. 4 may be received between the wall members 18, 20, 22 and 24 of bottom portion 14 as seen in FIG. 5 so that the flexible tabs 26, 28, 30 and 32 extend thereover. When top portion 12 has been so positioned, the cover 10 occupies very little space. Additionally, the handle 84 provides a convenient means for carrying the collapsed cover.

When it is desired to use the cover to cover a cake or the like, the top portion 12 is removed from the position seen in FIG. 5 by simply bending the tabs 26, 28, 30 and 32 upwardly and raising the top portion 12 from between the wall members 18, 20, 22 and 24. Top portion 12 is then assembled by unfolding the flaps 42, 44, 46 and 48 from the position of FIG. 4 to the position of FIG. 6. The tab fasteners 70, 72, 74 and 76 are then secured to the fastener elements 34' which are provided on each of the flaps 42, 44, 46 and 48 to maintain the top portion 12 in its assembled condition. The fastener elements 34' are received by the openings 78 in the tab fasteners.

The cake may then be placed on base portion 16. Top portion 12 is then placed on the bottom portion 14 in the manner seen in FIG. 6 so that The lower ends of the flaps 42, 44, 46 and 48 are received between the wall members of the bottom portion 14. The tab fasteners 80 are secured to the fastener elements 34 as illustrated in FIGS. 6 and 7 to maintain the top portion 12 on bottom portion 14. The means by which the top portion 12 is maintained in its assembled condition and the means by which the top portion 12 is secured to bottom portion 14 positively prevents the cover 10 from inadvertently opening.

The close relationship of the flaps and the wall members prevents the cake from drying out while in the cover 10. It can be seen that a novel cake cover cover has been provided which occupies a minimum of space while in its unassembled condition and which unfolds to a durable and convenient cake cover. The cover is preferably of plastic construction but may be constructed of cardboard or the like if so desired.

Thus it can be seen that the cover accomplishes at least all of its stated objectives.

I claim:
1. In a foldable cake cover,
   a bottom portion,
   a foldable top portion,
   said top portion being normally in a folded flat condition,
   means on said foldable top portion for unfolding said top portion from its flat condition to an assembled condition,
   second means on said top portion for maintaining said top portion in its assembled condition,
   third means for detachably securing said assembled top portion to said bottom portion,
   said bottom portion comprising a flat quadrilateral base member having upstanding wall members at its periphery, said top portion being receivable within and securable to said wall members,
   said top portion being receivable between said wall members when in its flat condition, and
   fourth means for maintaining said folded top portion between said wall members.

2. The cover of claim 1 wherein said fourth means comprises at least two flexible flaps extending inwardly from said wall members over said folded top portion.

3. The cover of claim 1 wherein said folded top portion has a handle means thereon which extends upwardly therefrom between said wall members for carrying said folded top portion and said bottom portion when said folded top portion is received between said wall members.

* * * * *